Figure 1:
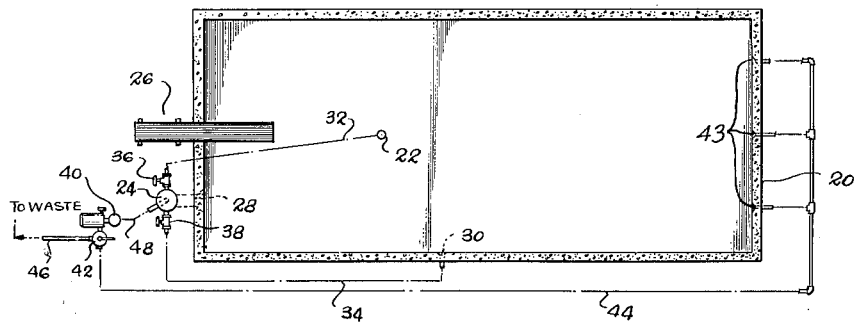

April 11, 1961   A. Z. KONOPKA ET AL   2,979,206

SWIMMING POOL FILTER

Filed May 5, 1958

INVENTORS
ALFRED Z. KONOPKA
RICHARD O. LIGHTFOOT
BY
ATTORNEY

2,979,206
Patented Apr. 11, 1961

2,979,206

SWIMMING POOL FILTER

Alfred Z. Konopka, Van Nuys, and Richard Owen Lightfoot, Los Angeles, Calif., assignors to Paddock Pool Equipment Co., Los Angeles, Calif., a corporation of California Filed May 5, 1958, Ser. No. 733,110

7 Claims. (Cl. 210—169)

This invention relates to filter systems for swimming pools, and more particularly to an improved combination filter and skimmer unit for swimming pool filter systems.

Briefly stated, the invention provides a combination filter and skimmer unit equipped with a filter tank having first, second and third inlets, a discharge, and a filter element through which water, flowing from the inlets to the discharge, passes. Mounted on the upper end of this filter tank is a skimmer for removing debris which floats on the surface of the water in a swimming pool. This skimmer empties into the filter tank through a first inlet of the latter and has an enlarged inlet for opening through the side wall of the swimming pool at the normal water level in the pool.

In a swimming pool installation of the filter unit, the second inlet of the filter tank communicates to a main drain in the bottom of the pool through a suitable pipeline, while the third inlet of the tank communicates through a suitable pipeline to a vacuum fitting installed in the side wall of the pool a few inches below the normal water level. This vacuum fitting is intended for connection to the hose of a pool vacuum cleaner.

The discharge of the filter tank connects to the intake of a suction pump. The water exhausted from the pump may be returned to the swimming pool or directed to waste by operation of valves at the discharge side of the pump.

In normal operation of the present filter, the vacuum fitting inlet of the filter tank, that is, the third inlet, is closed by a valve in the vacuum line. Under these conditions, the surface water of the pool flows over the skimmer into the filter tank through the first inlet of the latter and water is drawn from the bottom of the pool into the filter tank through the second inlet of the latter. The skimmer acts to remove debris which floats on the surface of the water, while the filter element in the filter tank, through which the water flows from the tank inlets to the discharge, filters out solid matter which is entrained in the water. The filtered water is then returned to the pool.

In the normal installed position of the filter tank, the second inlet of the latter, which connects to the main drain of the pool, is located just below the normal water level of the pool. There is, therefore, only a slight tendency for water to flow under the action of gravity, from the pool to the filter tank.

This fact, coupled with the greater resistance to flow of water through the relatively long pipeline between the main drain of the pool and the main drain inlet of the filter tank than to the gravity induced flow of surface water over the skimmer into the filter tank will result in an appreciably higher rate of flow of water from surface of the pool into the filter tank than from the bottom of the pool into the filter tank in the absence of means for regulating the flow of water through the skimmer. In order to achieve a desired or optimum distribution or proportioning of the flow to the filter from the bottom and surface of the pool, therefore, it is necessary that means be provided for regulating flow to the filter through the skimmer.

A broad object of the present invention is the provision of a new and improved swimming pool filter of the character described.

A more specific object of the invention is the provision of a swimming pool filter of the character described wherein the rate of flow of water into the filter tank through the skimmer may be regulated so as to obtain an optimum or any desired proportioning of flow from the surface and bottom of the pool to the filter.

As previously indicated, the present filter is also designed for use in a pool vacuuming operation. To this end, the skimmer valve, by which the flow of water through the skimmer may be regulated, as just mentioned, is designed so as to permit complete closure of the first, or skimmer inlet opening of the filter tank. A valve is also provided for closing the second or main drain inlet of the filter tank.

During operation of the filter pump, with both of these valves closed, therefore, a vacuum is created in the filter tank. A pool vacuum cleaner may then be connected to the vacuum fitting on the pool side wall, in which case the vacuum created in the filter tank causes water to be drawn through the vacuum cleaner.

Accordingly, it is a further object of this invention to provide a swimming pool filter of the character described which is uniquely designed for use with a pool vacuum cleaner.

Yet a further object of the invention is the provision of a swimming pool filter of the character described which is relatively simple in construction, reliable in operation, and otherwise especially well suited to its intended function.

Other objects, advantages and features of the invention will become readily apparent as the description proceeds.

Figure 2:
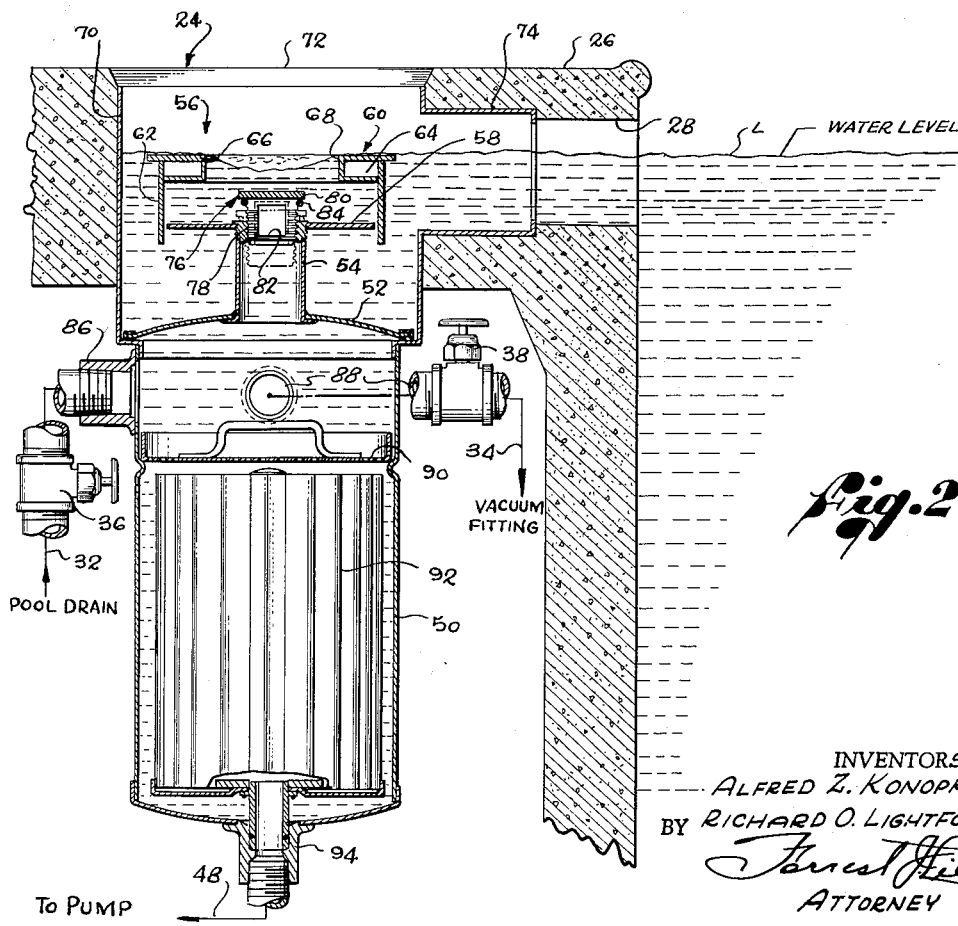

The invention may be best understood from the following detailed description, taken in connection with the annexed drawings, wherein:

Fig. 1 is a diagrammatic view showing a swimming pool filter system embodying the present filter unit; and Fig. 2 is an enlarged section through the present filter unit, the latter being shown in installed position.

Referring now to these drawings, the numeral 20 denotes a swimming pool equipped with a conventional main drain 22. The present filter and skimmer unit 24, in normal installed position, is housed within a well in the deck 26 of the pool and in relatively close proximity to the side wall of the pool, as shown.

Indicated at 28 is an enlarged opening in the side wall of the pool which, as will shortly be seen, is located at the normal water level in the pool and communicates with the skimmer of the present filter. The vacuum fitting 30, which is intended to be connected to the hose of a pool vacuum cleaner, is fixedly mounted in the side wall of the pool, as shown, just below the normal water level of the pool. The main drain fitting 22 and the vacuum fitting 30 are connected via lines 32 and 34 with two inlets of the present filter unit 24, as will shortly be seen. These lines have shut-off valves 36 and 38 therein.

Indicated at 40 is the filter pump. This pump discharges to a valve 42 which may be operated to direct water from the pump to inlets 43 in the side wall of the pool 20 through a line 44 or to a waste connection 46. Extending between the intake of pump 40 and the filter unit 24 is a suction line 48.

Referring now to Fig. 2, illustrating the present filter unit 24 in enlarged section, the latter will be seen to comprise a unitary casing 49 including a lower filter tank 50. The upper end of this tank is closed by a removable end wall 52 formed with a central, upstanding sleeve 54. The interior passage of this sleeve opens at its lower end into the tank 50.

Mounted on the upper end of the sleeve 54 is a surface skimmer 56, illustrated as being of the type disclosed in Patent No. 2,579,304. As described more fully in this patent, the skimmer 56 comprises a disc 58 fixed to the upper end of the sleeve 54 and a surface skimmer float 60, including a cylindrical shell 62 which is slideably fitted over the disc 58.

This float is afforded positive buoyancy by means of a hollow chamber or buoyant material 64, and has an upper annular wall 66 formed with a central opening 68 through which water may flow to the sleeve 54.

The end wall 52 of the filter tank 50 comprises an internal partition in the casing 49 which divides the latter into the lower filter tank and an upper collector tank 70 in which the skimmer 56 is located. The open top of this collector tank 70 defines a top opening on the casing 49 which is closed by removable cover 72. Extending laterally of the collector tank is a skimmer unit 74 which, in the installed position of the filter, extends into the skimmer inlet opening 28 in the pool side wall. As previously mentioned, and as shown in Fig. 2, this inlet opening 28 is located at the normal water level L in the pool. Accordingly, water fills the collector tank 70 to the level shown. The skimmer float 60 tends to float at the water level L and skim off debris from the surface of the water flowing over the skimmer to the first tank inlet or sleeve 54, in the manner more fully described in the aforesaid patent, No. 2,579,304.

As preliminarily mentioned, it is necessary to regulate flow of water from the skimmer 56 to the filter tank 50. To this end, the inlet sleeve 54 mounts an adjustable proportioning and shut-off valve 76. Valve 76 may be of any suitable design, but has been illustrated as comprising a sleeve 78 open at its lower end and threaded in the upper end of the inlet sleeve 54. The upper end of the valve sleeve 78 is closed by peripherally knurled, disc-shaped end 80.

The sleeve 78 is cut away to form openings 82, through which water may flow to the interior passage of the valve sleeve 78, and thence to the passage in the inlet sleeve 54. Valve sleeve 78 is adapted to be threaded into and out of the inlet sleeve 54, in order to vary the effective area of the sleeve openings 82, and thereby regulate the flow of water into the filter tank 50. As preliminarily indicated, during a pool vacuuming operation, it is necessary to close the inlet sleeve 54. This is accomplished by threading the valve sleeve 78 completely into the inlet sleeve 54, a seal ring 84 being provided for sealing the valve sleeve 78 to the skimmer disc 58 when the valve sleeve is in closed position.

In Fig. 2, the numerals 86 and 88 denote the aforementioned second and third inlets of the filter tank 50, which are connected via the lines 32 and 34, respectively, to the main drain and vacuum fittings 22 and 24 of the pool. Water entering the filter tank 50 through the inlets 54, 86 and 88 flows through a basket screen 90 and a filter element 92 to the discharge 94 of the filter tank.

Discharge 94 of the filter tank connects to the intake of pump 40, via the suction line 48.

In normal operation of the filter 24, the valve 38 in the vacuum fitting line 34, extending between the inlet 88 of the filter tank 50 and the vacuum fitting 30, is closed, while the valve 36 in the main drain line 32, extending to the inlet 86 of the filter tank, is open. During operation of the pump 40, with the pump valve 42 positioned to return water to the swimming pool, the skimmer valve 76 may be adjusted for regulating the rate of flow of water through the filter tank inlet 54 to obtain an optimum or any desired proportioning of the flow of water to the filter through the latter inlet and the main drain inlet 84.

The water entering the filter tank 50 flows through the filter element 92 and is then returned by the pump 40 to the pool.

During a pool cleaning operation, the skimmer valve 76 and the main drain line valve 36 are closed and the vacuum line valve 38 is open. The hose of a pool vacuum cleaner (not shown) may then be connected to the vacuum fitting 30. When the pump 40 is operated, water is exhausted from the filter tank 50, thereby creating a vacuum in the latter. This vacuum causes water to be drawn from the pool through the vacuum cleaner, the water flowing into the filter tank 50 through the vacuum inlet 88.

A highly important advantage of the present combination filtering and skimming device is obviously the one-piece construction of the filter-skimmer unit and the mounting of the proportioning and shut-off valve 76 directly on and below the top opening of the unit which makes for a relatively simple, inexpensive unit, greatly facilitates installation of the unit, and renders the latter easy to adjust.

It will be apparent, therefore, that there has been described and illustrated a swimming pool filter which is fully capable of attaining the various objects and advantages preliminarily set forth. While a preferred embodiment of the invention has been disclosed for illustrative purposes, it will be obvious that numerous modifications in design and arrangement of parts are possible within the scope of the following claims.

We claim:

1. A combination filtering and surface skimming device for swimming pools comprising a hollow, unitary, normally upright casing means including an internal partition which divides the casing means into an upper collector tank and a lower filter tank and means defining a passage communicating said tanks through which water flows from the collector tank to the filter tank during normal operation of the device, said casing means having a first lateral inlet to said collector tank, a second inlet to said filter tank, and an outlet from the filter tank, an adjustable proportioning and shut-off valve mounted directly in said casing means for controlling water flow through said passage and including a valve member which is accessible from the upper end of the casing means to regulate water flow through said passage to any desired flow rate and to completely cut off flow of water from said collector tank to said filter tank, surface skimming means in said collector tank, and filter means in said filter tank to filter water flowing through the tank to said tank outlet.

2. A combination filtering and surface skimming device for swimming pools comprising a hollow, unitary normally upright casing means defining a filter tank and a collector tank integral with the filter tank, there being an inlet to said collector tank, an inlet to the filter tank, and an outlet from the filter tank, said casing including means defining a passage communicating said tanks through which water flows from the collector tank to the filter tank during normal operation of the device, said casing means having a top opening, a removable cover to close said top opening, an adjustable proportioning and shut-off valve within said casing means below said top opening for controlling water flow through said passage and including a valve member which is positioned to be accessible through said top opening to regulate water flow through said passage to any desired flow rate and to completely cut off water flow from the collector tank to the filter tank, surface skimming means within said collector tank, and filter means within said filter tank for filtering water flowing through the filter tank to the tank outlet.

3. A combination filtering and surface skimming device for swimming pools comprising a hollow, unitary normally upright casing means defining an upper collector tank and a lower filter tank, there being a lateral inlet to said collector tank, an inlet to said filter tank, and an outlet from the filter tank, said casing having means defining a passage communicating said tanks through which water flows from the collector tank to the filter tank during normal operation of the device, said casing means having a normally horizontal top opening, a removable cover to close said top opening, an adjustable proportioning and shut-off valve within the casing means below said top opening for controlling water flow through said passage including a rotatable valve member which is accessible through said top opening and turnable on a normally vertical axis to regulated flow of water through said passage to any desired flow rate and to completely cut off water flow from the collector tank to the filter tank, surface skimming means in said collector tank, and filter means in said filter tank to filter water flowing through the filter tank to said outlet.

4. A combination filtering and surface skimming device for swimming pools comprising a hollow, normally upright casing, an imperforate partition extending across the inside of said casing and dividing the latter into an upper collector tank and a lower filter tank, said casing having a lateral inlet to said collector tank, an inlet to said filter tank, and an outlet from the filter tank, means defining a passage through said partition communicating said tanks through which water flows from the collector tank to the filter tank during normal operation of the device, an adjustable proportioning and shut-off valve means on said partition which is adjustable to regulate water flow through said passage to any desired flow rate and to completely cut off water flow from the collector tank to the filter tank, said casing having a top opening through which said valve means is accessible for adjustment thereof, a removable cover for closing said top opening, surface skimming means in said collector tank, and filter means in said filter tank for filtering water flowing through the filter tank to said outlet.

5. The subject matter of claim 4 wherein said passage-defining means comprises an upright sleeve extending through said partition, and said valve means comprises a rotatable valve member on the sleeve and openings communicating the interior of the sleeve to said collector tank which are varied in effective size by turning of the valve member.

6. In combination with a swimming pool having a main drain in its bottom, a surface skimming opening in its side at the normal water level of the polo, and an inlet, a combination filtering and surface skimming unit positioned within a well at the side of the pool, said unit comprising a hollow, unitary casing means defining a filter tank and a collector tank integral with the filter tank, said collector tank having a lateral inlet communicating with said skimming opening, said filter tank having a main drain inlet, and a pool outlet, a pump having its intake connected to said tank outlet, a pipe connecting the main drain of the pool to said main drain inlet of the filter tank, a pipe connecting the discharge of said pump to said inlet of the swimming pool, said casing including means defining a passage communicating said tanks through which water flows from the collector tank to the filter tank during normal operation of the device, said casing means having a top opening, a removable cover to close said top opening, an adjustable proportioning and shut-off valve means within the casing means below said top opening to regulate water flow between the collector tank and filter tank through said passage, surface skimming means in said collector tank, and filter means in the filter tank to filter water flowing through the filter tank to said outlet.

7. The subject matter of claim 6 wherein said valve means comprises a rotatable valve member below said top opening which is turnable on a vertical axis.

References Cited in the file of this patent

UNITED STATES PATENTS

| 1,139,331 | Boulard | May 11, 1915 |
| 2,579,304 | Crawford | Dec. 18, 1951 |
| 2,701,235 | King | Feb. 1, 1955 |
| 2,809,752 | Leslie | Oct. 15, 1957 |
| 2,844,255 | Cavenah et al. | July 22, 1958 |

FOREIGN PATENTS

| 348,794 | Great Britain | May 21, 1931 |